United States Patent
Sun et al.

(10) Patent No.: US 9,914,475 B2
(45) Date of Patent: Mar. 13, 2018

(54) HUMANIZED STEERING MODEL FOR AUTOMATED VEHICLES

(71) Applicant: Delphi Technologies, Inc., Troy, MI (US)

(72) Inventors: Ludong Sun, Stanford, CA (US); Michael H. Laur, Mission Viejo, CA (US); Jonathan L. Wieskamp, Sunnyvale, CA (US); Miao Yan, San Jose, CA (US)

(73) Assignee: DELPHI TECHNOLOGIES, INC., Troy, MI (US)

(*) Notice: Subject to any disclaimer, the term of this patent is extended or adjusted under 35 U.S.C. 154(b) by 170 days.

(21) Appl. No.: 14/874,760

(22) Filed: Oct. 5, 2015

(65) Prior Publication Data

US 2017/0096164 A1 Apr. 6, 2017

(51) Int. Cl.
*G05D 1/00* (2006.01)
*B62D 6/00* (2006.01)
(Continued)

(52) U.S. Cl.
CPC .............. *B62D 6/002* (2013.01); *B62D 1/04* (2013.01); *B62D 6/007* (2013.01);
(Continued)

(58) Field of Classification Search
USPC .... 701/28, 23, 36, 44; 706/900–905, 25–26, 706/41, 44; 312/587
See application file for complete search history.

(56) References Cited

U.S. PATENT DOCUMENTS 5,566,072 A * 10/1996 Momose ................. B60T 8/174
701/117
5,684,696 A * 11/1997 Rao ..................... B60K 31/0008
318/587

(Continued)

FOREIGN PATENT DOCUMENTS

WO     2014-009031 A2     1/2014

OTHER PUBLICATIONS

Human machine interface concept for interactive motion control of a highly maneuverable robotic vehicle; Tilman Bünte; Jonathan Brembeck; Lok Man Ho; 2011 IEEE Intelligent Vehicles Symposium (IV); Year: 2011; pp. 1170-1175, DOI: 10.1109/IVS.2011.5940490.*

(Continued)

*Primary Examiner* — Cuong H Nguyen
(74) *Attorney, Agent, or Firm* — Lawrence D. Hazelton

(57) ABSTRACT

A humanized steering system for an automated vehicle includes one or more steering-wheels operable to steer a vehicle, an angle-sensor configured to determine a steering-angle of the steering-wheels, a hand-wheel used by an operator of the vehicle to influence the steering-angle and thereby manually steer the vehicle, a steering-actuator operable to influence the steering-angle thereby steer the vehicle when the operator does not manually steer the vehicle, a position-sensor operable to indicate a relative-position an object proximate to the vehicle, and a controller. The controller is configured to receive the steering-angle and the relative-position, determine, using deep-learning techniques, a steering-model based on the steering-angle and the relative-position, and operate the steering-actuator when the operator does not manually steer the vehicle to steer the vehicle in accordance with the steering-model, whereby the (Continued)

vehicle is steered in a manner similar to how the operator manually steers the vehicle.

12 Claims, 3 Drawing Sheets

(51) Int. Cl.
    *B62D 1/04*     (2006.01)
    *B60G 17/016*     (2006.01)
    *G01S 13/89*     (2006.01)

(52) U.S. Cl.
    CPC ...... *B60G 17/0162* (2013.01); *B60G 2400/40* (2013.01); *G01S 13/89* (2013.01)

(56) References Cited

U.S. PATENT DOCUMENTS

| | | | |
|---|---|---|---|
| 9,524,461 B1* | 12/2016 | Huynh | G06N 3/04 |
| 2004/0098185 A1 | 5/2004 | Wang | |
| 2004/0158355 A1* | 8/2004 | Holmqvist | G05D 1/0236 |
| | | | 700/245 |
| 2010/0109881 A1 | 5/2010 | Eskandarian et al. | |
| 2012/0283910 A1 | 11/2012 | Lee et al. | |
| 2015/0197248 A1 | 7/2015 | Breed et al. | |
| 2016/0001781 A1* | 1/2016 | Fung | G06F 19/345 |
| | | | 701/36 |
| 2016/0003935 A1* | 1/2016 | Stainvas Olshansky | G01S 7/415 |
| | | | 342/70 |
| 2016/0034809 A1* | 2/2016 | Trenholm | H04L 41/5041 |
| | | | 706/20 |
| 2016/0098606 A1* | 4/2016 | Nakamura | G06K 9/00805 |
| | | | 382/103 |
| 2016/0248904 A1* | 8/2016 | Duvaut | H04W 4/027 |

OTHER PUBLICATIONS

Modeling and characteristic curves of electric power steering system; Hui Zhang; Yuzhi Zhang; Jinhong Liu; Jing Ren; Yongjun Gao; 2009 International Conference on Power Electronics and Drive Systems (PEDS); Year: 2009; pp. 1390-1393, DOI: 10.1109/PEDS.2009.5385774.*
Active torque control of electric power steering system using composite nonlinear feedback control; Nai Ho Ling; Yahaya Md. Sam; 2015 IEEE Student Conference on Research and Development (SCOReD); Year: 2015; pp. 150-155, DOI: 10.1109/SCORED.2015.7449313.*
A robust and optimal LQR controller design for Electric Power Steering system; Cristian Chitu; Jochen Lackner; Martin Horn; Helmut Waser; Markus Kohlböck; Proceedings of the Joint INDS'11 & ISTET'11; Year: 2011; pp. 1-5, DOI: 10.1109/INDS.2011.6024779.*
Tesla cars can drive themselves starting tomorrow—The Verge, by Chris Ziegler on Oct. 4, 2015, 5 pages.*
Toyota's new self-driving car has two steering wheels to prevent robot joyriding—by Hawkins, Sep. 27, 2017, 9 pages.*
Detroit is kicking Silicon Valleys ass in the race to build self-driving cars—The Verge, by Hawkins, Apr. 3, 2017, 5 pages.*
GM aims to speed up self-driving car development by buying Cruise Automation—The Verge, by Ziegler, Mar. 11, 2016, 4 pages.*

\* cited by examiner

| SUNNY | CLOUDY | FOGGY | RAINY | SNOWY | WINDY |
|-------|--------|-------|-------|-------|-------|
| 1 | 0 | 0 | 0 | 0 | 0 |

FIG. 2

| | | |
|---|---|---|
| LEFT-FRONT | FRONT | RIGHT-FRONT |
| LEFT | VEHICLE | RIGHT |
| LEFT-BACK | BACK | RIGHT-BACK |

FIG. 3

HUMANIZED STEERING MODEL FOR AUTOMATED VEHICLES

TECHNICAL FIELD OF INVENTION

This disclosure generally relates to a humanized steering system for an automated vehicle, and more particularly relates to using deep-learning techniques to develop a steering-model that steers the vehicle in a manner similar to how an operator manually steers the vehicle.

BACKGROUND OF INVENTION

Fully automated (i.e. autonomous) vehicles that steer the vehicle without any manual input from an operator of the vehicle have been proposed. However, the algorithms that control the steering of the vehicle have performance tuning variables that make tuning the algorithm for passenger comfort complicated. Even when passenger comfort is considered, the performance of the algorithms only provides superior comfort during the specific steering scenarios that were used to tune the algorithm. What is needed is an algorithm or steering model that mimics the steering characteristics of a human operating the vehicle.

SUMMARY OF THE INVENTION

In accordance with one embodiment, a humanized steering system for an automated vehicle is provided. The system includes one or more steering-wheels operable to steer a vehicle. The system also includes an angle-sensor configured to determine a steering-angle of the steering-wheels. The system also includes a hand-wheel used by an operator of the vehicle to influence the steering-angle and thereby manually steer the vehicle. The system also includes a steering-actuator operable to influence the steering-angle thereby steer the vehicle when the operator does not manually steer the vehicle. The system also includes a position-sensor operable to indicate a relative-position an object proximate to the vehicle. The system also includes a controller configured to receive the steering-angle and the relative-position. The controller is further configured to determine, using deep-learning techniques, a steering-model based on the steering-angle and the relative-position, and operate the steering-actuator when the operator does not manually steer the vehicle to steer the vehicle in accordance with the steering-model, whereby the vehicle is steered in a manner similar to how the operator manually steers the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 is a table of data in the system in accordance with one embodiment;

FIG. 3 is diagram of data in the system of FIG. 1 in accordance with one embodiment.

DETAILED DESCRIPTION

Figure 1:
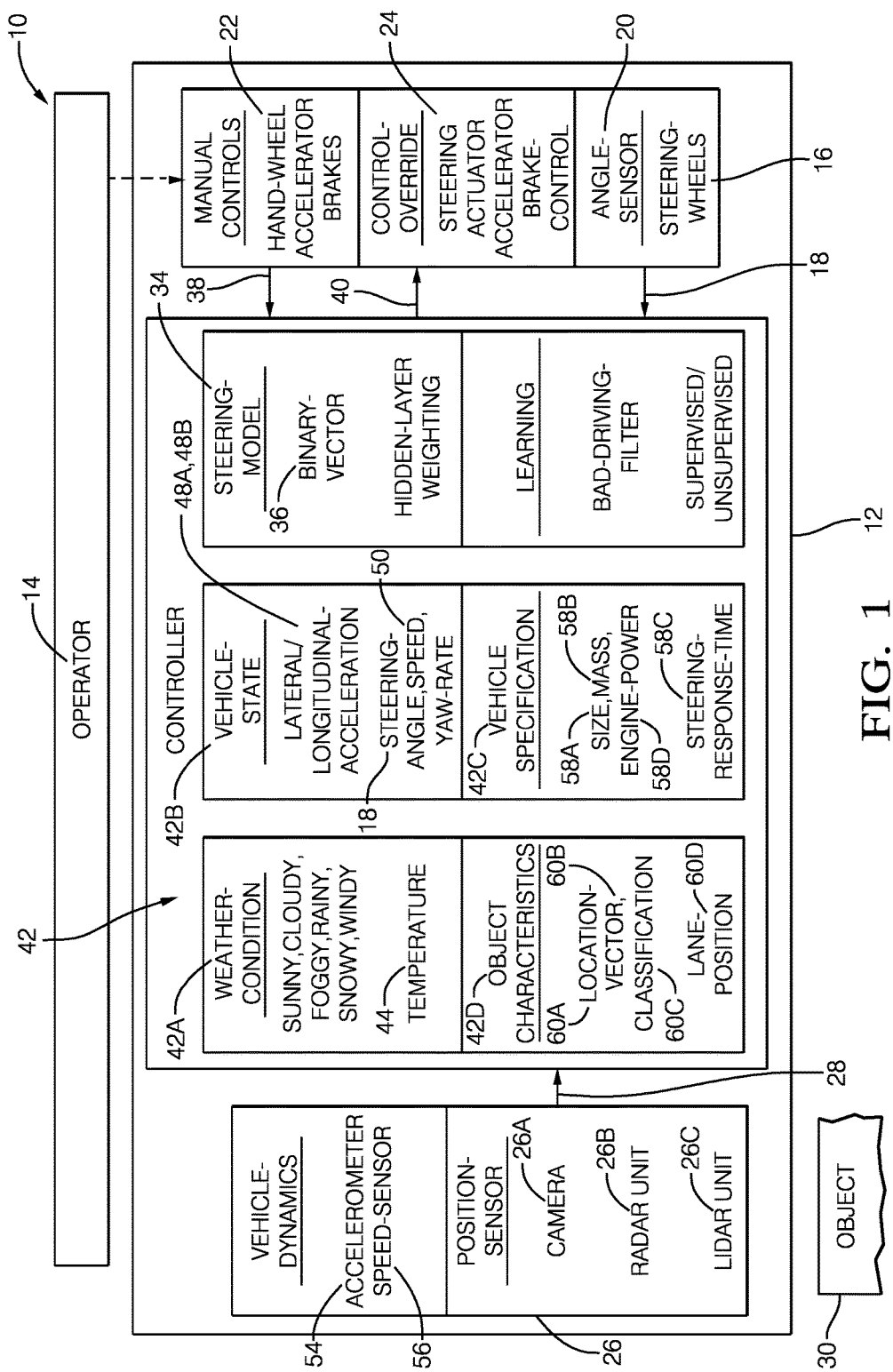
FIG. 1 is a diagram of a humanized steering system for an automated vehicle in accordance with one embodiment.

FIG. 1 illustrates a non-limiting example of a humanized steering system, hereafter referred to as the system 10. While the description of the system 10 presented herein is generally directed to a fully-automated (i.e. autonomous) vehicle, hereafter referred to as the vehicle 12, it is contemplated that the teachings presented herein are applicable to partially automated vehicles that may momentarily take-over control of the vehicle 12 or momentarily assist the an operator 14 with manually steering the vehicle 12 to, for example, avoid another vehicle.

The system 10, or more specifically the vehicle 12, is equipped with one or more steering-wheels, hereafter the steering-wheels 16. The steering-wheels 16 may be generally characterized as operable to steer the vehicle 12. While the vehicle 12 is expected to typically be a four-wheeled automobile, it is contemplated that the teachings presented herein will also be applicable to two-wheeled or three-wheeled vehicles equipped with a single steering-wheel, articulated vehicles that steer by varying the relative angle between a forward and rear portions of the vehicle, and other wheeled vehicles possibly equipped with many more than four wheels and/or more than two steering-wheels.

In order for the system 10 to determine the angle or direction of the steering-wheels 16, the system includes an angle-sensor 20 configured to determine and/or indicate a steering-angle 18 of the steering-wheels 16. The angle-sensor may use one of variety of technologies such as variable resistance, variable reluctance, or digital position-encoder to output or provide a signal indicative of the steering-angle 18.

As will be explained in more detail later, the system 10 described herein is generally configured to operate or steer the vehicle 12 in a manner that mimics the manner in which a human-being (i.e. the operator 14) manually steers the vehicle 12. In general, the system 'learns' the manner in which the operator 14 manually steers the vehicle 12 by observing/recording a variety of aspects that influence how the operator 14 may steer the vehicle 12, and then builds a mathematical model in an effort to duplicate that observed behavior.

In order for the operator 14 to be able to manually steer the vehicle 12, the system 10 (or the vehicle 12) is equipped with a hand-wheel 22 used or operable by the operator 14 of the vehicle 12 to influence the steering-angle 18, and thereby manually steer the vehicle 12. While the term hand-wheel is typically interpreted to be the relatively round hand-wheels typical found in an automobile, other alternative means of steering such as joy-sticks, handle-bars, reins, foot-pedals, push-buttons, rotary or sliding knobs, and the like are also contemplated and are included in the definition of the hand-wheel 22.

The system 10 also includes a steering-actuator 24 useful or operable to influence the steering-angle 18 so the system 10 is able to steer the vehicle 12 when the operator 14 does not manually steer the vehicle 12. In one embodiment, the steering-actuator 24 may result in the hand-wheel 22 moving as the steering-angle 18 changes, which is often the case for assisted-steering type steering-mechanisms. Alternatively, the steering-mechanism may be characterized as a steer-by-wire type steering-mechanism where there is no mechanical connection between the hand-wheel 22 and the steering-actuator 24. That is, in a steer-by-wire type system there may only an electrical connection so the hand-wheel 22 may not move in response to changes in the steering-angle 18 when the system 10, rather than the operator 14, is steering the vehicle 12.

The system 10 also includes a position-sensor 26 operable to indicate a relative-position 28 an object 30 proximate to the vehicle 12. Non-limiting examples of the object 30 include lane-markings on the surface of the roadway or travel-lane traveled by the vehicle 12, roadway-edges, signs, sign-posts, barriers such as guardrails, construction-barrels, pedestrians, animals, and other-vehicles such as automobiles, motorcycles, bicycles, and the like. The position-sensor 26 may include one or any combination of, but is not limited to, a camera 26A, a radar unit 26B, and a lidar unit 26C.

The system 10 also includes a controller 32 configured to receive, for example, the steering-angle 18, the relative-position 28, and/or manual-control signals 38 for observing/learning the manner in which the operator 14 operates (e.g. steers) the vehicle 12 when the operator 14 is manually operating the vehicle 12. The controller 32 is also configured to operate or steer the vehicle 12 in a manner similar to how the operator 14 manually steers the vehicle 12 when the operator 14 is not manually operating or steering the vehicle 12.

The controller 32 may include a processor (not specifically shown) such as a microprocessor or other control circuitry such as analog and/or digital control circuitry including an application specific integrated circuit (ASIC) for processing data, as should be evident to those in the art. The controller 32 may include memory (not specifically shown), including non-volatile memory, such as electrically erasable programmable read-only memory (EEPROM) for storing one or more routines, thresholds, and captured data. The one or more routines may be executed by the processor to perform steps for determining the manner in which the operator 14 manually operates or steers the vehicle 12, and autonomously operating the vehicle 12 in a similar manner, as described herein.

Given the information present in, for example, the steering-angle 18 from the angle-sensor 20, the relative-position 28 and other information about the object 30 (e.g. size, shape, motion, classification, etc.) from the position-sensor 26, the controller is configured to determine, using deep-learning techniques, a steering-model 34 based on at least the steering-angle 18 and the relative-position 28. Using deep-learning techniques is advantageous over control-theory based techniques because deep learning relaxes some of pre-conceived notions or assumptions necessary for control-theory based model-construction techniques. Deep-learning techniques readily include effects of real-time conditions such as, for example, how temperature can influence tire stiffness, and/or how a steering maneuver affects passenger comfort. The steering model 34 may be constructed or trained using Recurrent Neural Networks (RNNs) which are time-based deep learning methods that can be implemented in a dynamic system.

The steering-model 34 has an input data structure that may be characterized as a binary-vector 36 that includes many kinds of inputs like weather, obstacles, vehicle state, and/or vehicle position in lane. Each bit or combination of bits in the binary-vector represents an element of input. Once the steering-model 34 is determined, the system 10 is able to operate the steering-actuator 24 when the operator 14 does not manually steer the vehicle 12 to steer the vehicle 12 in accordance with the steering-model 34. This provides a means whereby the vehicle 12 is steered in a manner similar to how the operator 14 manually steers the vehicle 12. By way of example and not limitation, the steering-model 34 may output a desired-angle 40 of steering-wheels 16 to steer the vehicle 12 when the operator 14 does not manually steer the vehicle 12. The control of the steering-actuator 24 in response to a changing value of the desired-angle 40 may be by way of a proportional-integral-derivative (PID) position control algorithm, as will be recognized by those in the art. Alternatively, the response-time-characteristics of the steering-actuator 24 may be included in the steering-model 34. In an alternative non-limiting embodiment the desired-angle 40 may instead be a desired-torque value output by the controller 32 and used to determine, for example, how much current is applied to the steering-actuator 24 in order for the steering-actuator 24 to generate or output to change the steering-angle 18 of the steering-wheels 16.

FIG. 2 illustrates a non-limiting example of the binary-vector 36, or a portion thereof. As suggested above, the steering-model 34 may be characterized by a binary-vector 36 which may be composed of a plurality of bits indicative of parameters 42 of the steering-model 34. Each bit of the binary-vector 36 may correspond to one element of input. For example, the bits that form the binary-vector 36 may indicate a variety weather conditions and use 1's and 0's to indicate those weather conditions. FIG. 2 is a suitable example of how a pleasant sunny day may be indicated. For the weather-condition 42A indicated, the steering-model 34 model would presume that the object 30 is readily or more confidently detected/classified by the camera 26A, and traction is good. In contrast, when the weather-condition 42A indicates that rainy or snowy are indicated, the operator 14 may manually steer the vehicle 12 in a more cautious manner, so steering-model 34 may be tuned to steer the vehicle 12 less aggressively when rainy or snowy conditions are indicated.

While not shown in FIG. 2, the weather-condition 42A may include a temperature 44. The temperature 44 may be indicated in the binary-vector 36 by an eight-bit number (000000000 to 11111111) where zero (0) corresponds to less than or equal to −65° C., and 11111111 corresponds to greater than or equal to 190° C. The temperature 44 may be used by the steering-model 34 to help determine if, for example, ice may have formed on the roadway, or estimate the stiffness of the tires of the vehicle 12 and adjust the parameters 42 of the binary-vector 36 such as a steering-response-time 46 of the vehicle-specification 42C.

The binary-vector 36 may include one or more of the parameters 42 indicative of the vehicle-state 42B, such as, but not limited to lateral-acceleration 48A and/or longitudinal-acceleration 48B (lateral/longitudinal-acceleration in FIG. 1), vehicle-speed 50, yaw-rate 52, and the steering-angle 18. Accordingly, the system 10 may include or be equipped with an accelerometer 54 and/or a speed-sensor 56. These variables may be indicated by a binary number input into the binary-vector 36. For example, the vehicle-speed 50 may be indicated by a seven-bit binary number so speeds from zero (0000000) to greater than or equal to one-hundred-twenty-seven (1111111) miles per hour can be indicated.

The binary-vector 36 may include one or more of the parameters 42 indicative of the vehicle-specification 42C, such as, but not limited to vehicle-size 58A (e.g. wheel-base and/or body-length), vehicle-mass 58B, steering-response-time 58D, and/or engine-power 58C. If the system 10 identifies an instance of the object 30 that needs to be steered around (i.e. avoided), all of these variable may affect how the vehicle 12 responds to a change in the steering-angle 18 and thereby affect what the operator 14 senses with regard to comfort and human-like steering behavior by the system 10.

The binary-vector 36 may include one or more of the parameters 42 indicative of the object-characteristic 42D, such as, but not limited to object-location 60A, object-vector 60B, object-classification 60C, and lane-position 60D. As suggested above, the object 30 may be anything that is present on or near a roadway. The object 30 may be something that is used by the system 10 to steer the vehicle into a particular biased value of the lane-position 60D. That is, the lane-position 60D may not be the center of a selected travel-lane. Alternatively, the object 30 may be within the forward travel-path of the vehicle 12, or moving in a direction (object-vector 60B) that will intersect with the forward travel-path.

By way of further example, the object-location 60A may be indicated in the binary vector by which of eight locations or directions about the vehicle 12 that the object 30 occupies. Eight bits may correspond to the directions shown in FIG. 3 which may be labeled in the binary-vector 36 as <Dir_LF>, <Dir_F>, <Dir_RF>, <Dir_L>, <Dir_R>, <Dir_LB>, <Dir_B>, <Dir_RB>, respectively. If the object 30 is large, such as a semi-tractor/trailer vehicle, which may occupy the right-front, right, and right-back directions or locations, then the object-location 60A in binary may be 00101001.

The object-classification 60C may be indicated by a combination of bits to indicate various information about an obstacle that includes classification, distance, and/or speed if the object 30 is moving. By way of example, 0000 means no obstacle, 0001 means a car, 0010 means a person, 0011 means an animal, 0100 means a road-block. Distance and speed may also be indicated in binary form in the binary-vector 36. Similarly, with regard to the lane-position 60D, 000 indicates "in the middle", 101 indicates "left of road", 001 indicates "right of road", 110 indicates "double-laning in the left" and 011 indicates "double-laning in the right".

The steering-model 34 may be implemented as a discrete time model with, for example, a sample/update rate of $\Delta T = 0.1$ seconds. The sample/update rate can be modified if the data collecting frequency is different. At time $T[i]$, the binary-vector 36 (i.e. the input for the steering-model 34) may be expressed as $X\_T[i]$. The steering-model 34 include a transformation function $H\_T[i]$, which is sometimes referred to as the hidden layer and characterized as being composed of neurons. That is, $H\_T[i]$ here is the hidden layer at time $T[i]$ with the new input $X\_T[i]$. By way of further explanation, neurons in the hidden layer are like neurons in a human brain that 'grab' the data from inputs and extract features or parameters from the input so that brain will learn how identify/categorize information and react to situations. The hidden layer is essentially invisible but is very important because the learning process happens here.

The output of the steering-model 34 at time $T[i]$ may be expressed as $Y\_T[i]$. The input (the binary-vector 36), the hidden layer $H\_T[i]$, and the output $Y\_T[i]$ may be connected or related to each other by weight-matrices WI, WH, and WO. The hidden layer $H\_T[i]$ may have 'grabbed' some features that will influence a future value of the desired-angle 40. Therefore, $H\_T[i]$ is considered when computing new hidden layer at time $T\_[i+1]$. Given input $X\_T[i+1]$ at time $T[i+1]$, then $H\_T[i+1]=f(WI*X\_T[i+1]+WH*H\_T[i])$, where f is an activation function. Usually, $f(x)=\tan h$, or $f(x)=1/(1+\exp(-x))$. Therefore the output at $T[i+1]$ is: $Y\_T[i+1]=fo(WO*(H\_T[i+1]))$, where fo is an activation function and usually $fo=\tan h$ or fo is sigmoid function.

The RNNs are characterized as a supervised learning algorithm, which means the input data that forms the binary-vector 36 are labeled. The labeled data means that given an input, the desired output is given so the learning process will be urged toward an acceptable solution. In this example, at time $T[i]$ there is a true output, $Yd\_T[i]$. However, for unsupervised learning, the data are unlabeled, that is, no responses are provided. The system 10 or more specifically the controller 32 needs classify the data by itself. Once classified, the system 10 uses a 'backpropagation through time' method to tune the weight matrices, WI, WH, and WO. The backpropagation method is used to minimize the error function by gradient descent.

At time $T[i]$, the step error is expressed as $E\_T[i]=\text{sum} [(Yd\_T[m]-Y\_T[m])^2]$, $m=1, 2, \ldots, L$, where L is the number of neurons in output layer. At time $T[n]$, define the accumulated error as the sum of step errors at a previous time $E\_a=\text{sum}(E\_T[i])$, $i=1, 2, 3, \ldots n$. Eqs. 1-3 illustrate applying backpropagation through time using the chain rule to calculate the derivation:

$$\frac{\partial E\_a}{\partial WI} = \sum_{i=1}^{n} \frac{\partial E\_T[i]}{\partial WI}, \qquad \text{Eq. 1}$$

$$\frac{\partial E\_a}{\partial WH} = \sum_{i=1}^{n} \frac{\partial E\_T[i]}{\partial WH}, \text{ and} \qquad \text{Eq. 2}$$

$$\frac{\partial E\_a}{\partial WO} = \sum_{i=1}^{n} \frac{\partial E\_T[i]}{\partial WO}. \qquad \text{Eq. 3}$$

Using gradient descent to update WI WH, and WO provides Eqs. 4-6.

$$\text{new } WI = WI - \eta \frac{\partial E\_a}{\partial WI}, \qquad \text{Eq. 4}$$

$$\text{new } WH = WI - \eta \frac{\partial E\_a}{\partial WH}, \text{ and} \qquad \text{Eq. 5}$$

$$\text{new } WO = WI - \eta \frac{\partial E\_a}{\partial WO}, \qquad \text{Eq. 6}$$

where $\eta$ is learning rate.

The problem of RNNs is vanishing gradient problem that is mentioned by Yoshua Bengio, Patrice Simard and Paolo Frasconi in a publication entitled Learning Long-Term Dependencies with Gradient Descent is Difficult, by Bengio, Smiard, and Frasconi, published in IEEE transactions on Neural Networks, VOL 5, NO. 2, March 1994. If this problem happened in training process, Long-Short-Term-Memory (LSTM) can be used to avoid it. The LSTM method presented below is adopted from on-line lecture notes (lecture 12) published by the Department of Computer Science at the University of Oxford which are course materials for Machine Learning in the 2014-2015 academic year.

Figure 4:
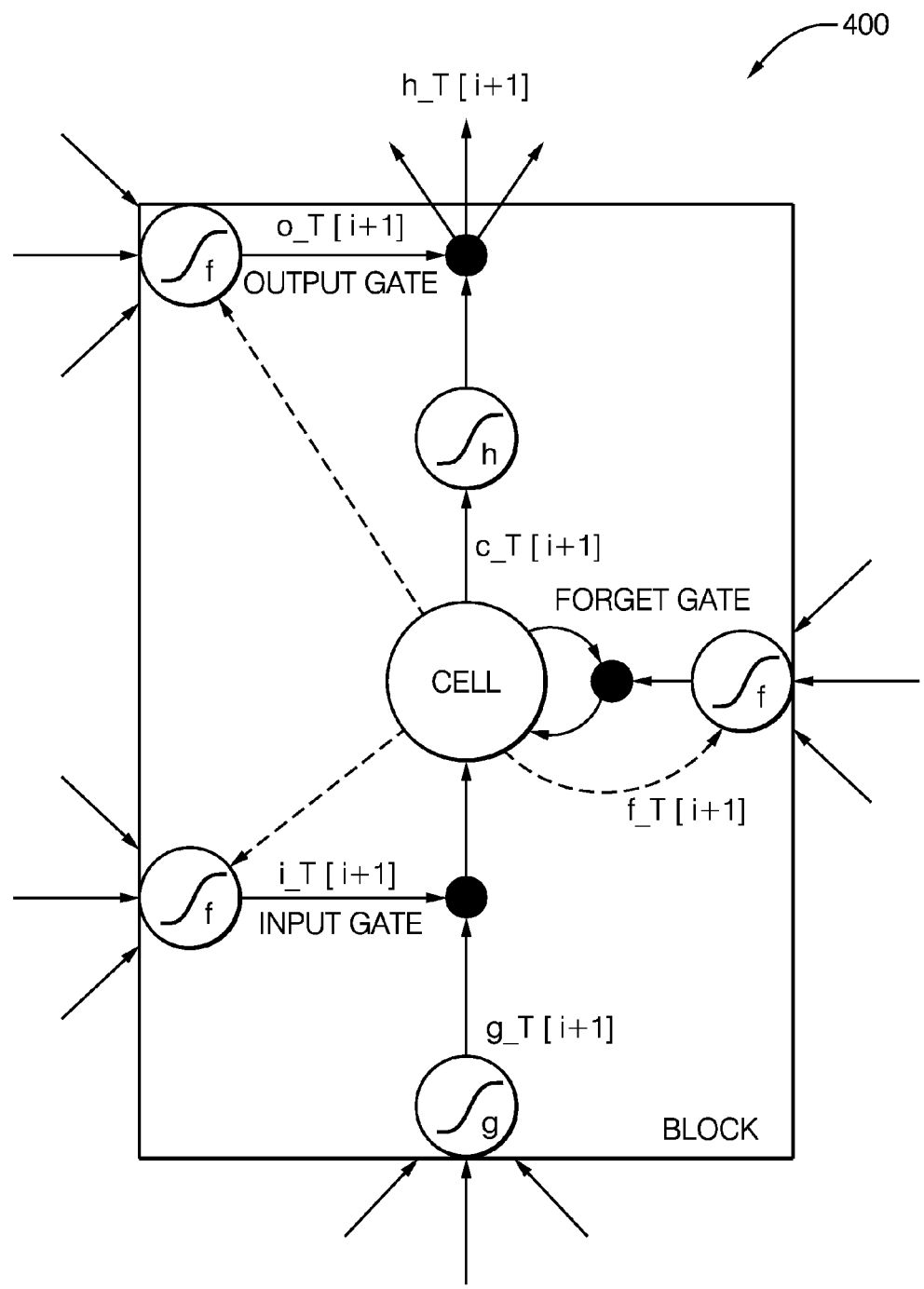
FIG. 4 is logic diagram of data of a process performed by the system of FIG. 1 in accordance with one embodiment.

FIG. 4 illustrates a non-limiting example of a logic diagram 400 to illustrate the process executed by the controller 32. The operations in the logic diagram 400 correspond to Eqs 7-12

$$i\_T[i+1]=f(Wxi*x\_T[i+1]+Whi*h\_T[i]), \qquad \text{Eq. 7,}$$

$$f\_T[i+1]=f(Wxf*x\_T[i+1]+Whf*h\_T[i]), \qquad \text{Eq. 8,}$$

$$o\_T[i+1]=f(Wxo*x\_T[i+1]+Who*h\_T[i]), \qquad \text{Eq. 9,}$$

$$g\_T[i+1]=g(Wxg^*x\_T[i+1]+Whg^*h\_T[i]),\qquad\text{Eq. 10,}$$

$$c\_T[i+1]=i\_T[i+1]\cdot g\_T[i+1]+f\_T[i+1]\cdot c\_T[i]\qquad\text{Eq. 11,}$$

$$h\_T[i+1]=o\_T[i+1]\cdot h(c\_T[i+1])\qquad\text{Eq. 12,}$$

where function f, g, h are activation functions, which can be sigmoid function, tan h, and · means element-wise multiplication.

With new h_T[i+1], repeat the process described above. Here use Wxi, Whi, Wxf, Whf, Wxo, Who, Wxg and Whg instead WI, WH. Use the backpropagation through time to tune the weight matrices. In real practice, there are several ways to affect the learning performance. The number of neurons in hidden layer is uncertain and it affects the training results. To reach the best result, divide the data into two parts: training set and testing set. Use the training set to apply the algorithm above to get the weight and use the test set to get the error. Adjust the number of neurons and repeat the learning process until the error reaches the smallest. Another way to improve the result may be adding biases and tune the biases during backpropagation. Adding more hidden layers in this algorithm is another way to improve the performance. Adding more hidden layers means that more previous time steps will be considered for the next step.

The system 10 learns to steer the vehicle 12 in a manner similar to a human being, e.g. the operator 14. To avoid learning bad driving habits, there are two choices: one is to apply a filter to ignore the bad driving time and keep the good one to learn; the other is to record the data of a good driver. Or combine two methods together to reach the best result.

The steering-model described herein provides for a system 10 that can steer the vehicle 12 in a manner that mimics the operator. Further understanding of the system 10 is provided by the description of several 'use cases' described below. For each of the use cases, the input can be different, but not all inputs need to be considered for each case.

The simplest case is lane keeping. In this case, the input can be defined as simple as: distance to a lane boundary (the lane-position 60D), the present value of the steering-angle 18, and the present value of the vehicle-speed 50. In general, know control algorithms tend to steer the vehicle toward the center of a travel lane. However, different people have different habits for driving. The output of the steering-model 34 does not necessary keep the vehicle in the center. It is more similar to the operator 14 whose data is used for training.

Lane changing is also very common. In addition to the input for lane keeping; inputs for obstacle-classification, obstacle-size, and distance to the object 30 may also need to be considered. Noting that different people handle driving situation differently; some drivers may want to avoid obstacles as early as possible while some drivers tend to make a quick lane change when getting close to the obstacles. In general, there is no fixed standard to judge the driving habits of the operator 14 as long as it is safe to themselves and others. The trained model can be better tuned to meet different people's habit by using different training data.

Another case is similar to existing on highway: a constant nonzero curvature path and also involves points with discontinuous curvature where vehicle transition from highway to ramp. In this case, in addition to lane keeping, comfort level is more important. Always staying on the center of the lane may not be a good choice. Most people will drive close to right lane boundary when on a ramp turning right and close to left lane boundary when on a ramp turning left so that the radius is bigger than just driving along the center and force exerted on drivers/passengers is reduced. If this scenario is in the training database, the trained model should be able to provide the torque curve which is more close to human.

Accordingly, a humanized steering system (the system 10) for an automated vehicle and a controller 32 for the system 10 are provided. The system 10 uses deep-learning techniques so the steering-model 34 is better able to mimic the steering behavior of a human-being, e.g. the operator 14.

While this invention has been described in terms of the preferred embodiments thereof, it is not intended to be so limited, but rather only to the extent set forth in the claims that follow.

We claim:

1. A humanized steering system for an automated vehicle, said system comprising:
   one or more steering-wheels operable to steer a vehicle;
   an angle-sensor configured to determine a steering-angle of the steering-wheels;
   a hand-wheel used by an operator of the vehicle to influence the steering-angle and thereby manually steer the vehicle;
   a steering-actuator operable to influence the steering-angle thereby steer the vehicle when the operator does not manually steer the vehicle;
   a position-sensor operable to indicate a relative-position an object proximate to the vehicle; and
   a controller configured to
   receive the steering-angle and the relative-position,
   determine, using deep-learning techniques, a steering-model based on the steering-angle and the relative-position while the operator is using the hand-wheel to manually steer the vehicle, and
   operate the steering-actuator when the operator does not manually steer the vehicle to steer the vehicle in accordance with the steering-model, whereby the vehicle is steered in a manner similar to how the operator manually steers the vehicle.

2. The system in accordance with claim 1, wherein the steering-model outputs a desired-angle of steering-wheels to steer the vehicle when the operator does not manually steer the vehicle.

3. The system in accordance with claim 1, wherein the steering-model is characterized by a binary-vector composed of a plurality of bits indicative of parameters of the steering-model.

4. The system in accordance with claim 3, wherein the binary-vector includes a parameter indicative of a weather-condition.

5. The system in accordance with claim 4, wherein the weather-condition includes sunny, cloudy, foggy, rainy, snowy, windy, and temperature.

6. The system in accordance with claim 3, wherein the binary-vector includes a parameter indicative of a vehicle-state.

7. The system in accordance with claim 6, wherein the vehicle-state includes lane-position, lateral-acceleration, longitudinal-acceleration, vehicle-speed, and the steering-angle.

8. The system in accordance with claim 3, wherein the binary-vector includes a parameter indicative of a vehicle-specification.

9. The system in accordance with claim 8, wherein the vehicle-specification includes vehicle-size, vehicle-mass, steering-response-time, and engine-power.

10. The system in accordance with claim 3, wherein the binary-vector includes a parameter indicative of an object-characteristic.

11. The system in accordance with claim 10, wherein the object-characteristic includes object-location, object-vector, object-classification, and lane-position.

12. The system in accordance with claim 3, wherein the binary-vector includes parameters indicative of a weather-condition, a vehicle-state, a vehicle-specification, and an object-characteristic.

\* \* \* \* \*